United States Patent
Yashiki

(10) Patent No.: US 10,877,315 B2
(45) Date of Patent: Dec. 29, 2020

(54) BACKLIGHT AND DISPLAY DEVICE PROVIDED WITH SAME

(71) Applicant: SHARP KABUSHIKI KAISHA, Sakai (JP)

(72) Inventor: Masafumi Yashiki, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 16/785,925

(22) Filed: Feb. 10, 2020

(65) Prior Publication Data

US 2020/0264476 A1 Aug. 20, 2020

Related U.S. Application Data

(60) Provisional application No. 62/806,673, filed on Feb. 15, 2019.

(51) Int. Cl.
*G02F 1/13357* (2006.01)
*G09G 3/32* (2016.01)

(52) U.S. Cl.
CPC ......... *G02F 1/133603* (2013.01); *G09G 3/32* (2013.01); *G09G 2310/0237* (2013.01)

(58) Field of Classification Search
CPC .......... G09G 3/32; G09G 3/3426; G09G 2300/0439; G09G 2310/08; G09G 2310/0205; G09G 2310/024; G09G 2310/0237; G09G 2320/0261; G09G 2320/064; G09G 2320/0646; G09G 1/133603
See application file for complete search history.

(56) References Cited

U.S. PATENT DOCUMENTS

| 2010/0134521 A1* | 6/2010 | Hente | G09G 3/3426 345/690 |
| 2012/0098876 A1* | 4/2012 | Murai | G09G 3/3406 345/690 |
| 2012/0169801 A1* | 7/2012 | Lee | G09G 3/3406 345/691 |

FOREIGN PATENT DOCUMENTS

| JP | 2011-013558 A | 1/2011 |
| WO | 2007/017797 A2 | 2/2007 |

* cited by examiner

*Primary Examiner* — Henry Luong
(74) *Attorney, Agent, or Firm* — ScienBiziP, P.C.

(57) ABSTRACT

A liquid crystal driving frequency detection unit that determines a liquid crystal driving frequency based on a vertical synchronization signal is provided in an LED drive circuit. In addition, a look-up table that holds a correspondence relationship between the liquid crystal driving frequency and the lighting frequency of the LEDs is provided in a control unit in the LED drive circuit. The correspondence relationship is held in the look-up table such that, for example, when the liquid crystal driving frequency becomes one-nth of that before change, the lighting frequency of the LEDs becomes n times of that before change. The LED drive circuit determines the lighting frequency of the LEDs by referring to the look-up table when the liquid crystal driving frequency changes.

5 Claims, 16 Drawing Sheets

Fig.5

| LIQUID CRYSTAL DRIVING FREQUENCY | LIGHTING FREQUENCY OF LED |
|---|---|
| 60 | 240 |
| 30 | 480 |
| 15 | 960 |

Fig.9

| LIQUID CRYSTAL DRIVING FREQUENCY | LIGHTING FREQUENCY OF LED |
|---|---|
| 120 | 240 |
| 90 | 240 |
| 60 | 240 |
| 30 | 480 |
| 15 | 960 |
| 1 | 960 |

BACKLIGHT AND DISPLAY DEVICE PROVIDED WITH SAME

CROSS REFERENCE TO RELATED APPLICATIONS

This application claims priority to U.S. Provisional Patent Application No. 62/806,673, entitled "BACKLIGHT AND DISPLAY DEVICE PROVIDED WITH SAME", filed on Feb. 15, 2019, the content of which is incorporated herein by reference.

BACKGROUND OF THE INVENTION

1. Field of the Invention

The following disclosure relates to a backlight including LEDs as light sources, and a display device including the backlight.

2. Description of Related Art

A transmissive type liquid crystal display device requires, in order to display images, backlight that irradiates a display portion (liquid crystal panel) with light from its back surface. Conventionally, as a light source of the backlight, a cold-cathode tube referred to as a CCFL has been widely used. However, in recent years, an LED (light-emitting diode) has become widely employed due to low power consumption and facilitation of luminance control.

Regarding the liquid crystal display device, in order to decrease power consumption, a technology called "local dimming" has been developed in which a screen is logically divided into a plurality of areas, and luminance (light emission intensity) of LED is controlled for each of the areas. According to the local dimming, the luminance of each of the LEDs is determined based on, for example, a maximum value, an average value, and the like of input gradation values of pixels included in a corresponding area. In this manner, each of the LEDs emits light with luminance depending on an input image for the corresponding area.

Now, LED dimming schemes will be described. The dimming schemes mainly include an analog dimming scheme and a PWM dimming scheme. In the analog dimming scheme, as shown in FIG. 12, the luminance of an LED is controlled by changing the magnitude of a current flowing through the LED, with the LED turn-on time being fixed. In the PWM dimming scheme, as shown in FIG. 13, the luminance of an LED is controlled by changing the LED turn-on time, with the magnitude of a current flowing through the LED being fixed.

As described above, the dimming schemes include the analog dimming scheme and the PWM dimming scheme. According to the analog dimming scheme, since a relationship between a current flowing through an LED and the luminance of the LED is nonlinear, it is difficult to implement such control that allows obtaining a desired luminance. In addition, the analog dimming scheme also has a problem that a change in chromaticity occurs depending on current values. Hence, in recent years, adoption of the PWM dimming scheme has become the mainstream.

In addition, regarding an interface (an interface for transfer of data for controlling the luminance of LEDs) of an LED drive circuit (LED driver IC), there are also two schemes. A first scheme is, as schematically shown in FIG. 14, a scheme in which a PWM signal is inputted to the LED drive circuit. The PWM signal inputted to the LED drive circuit is a low-voltage control signal. In the first scheme, the LED drive circuit outputs an LED drive signal based on the low-voltage control signal. According to the first scheme, since the input and the output have a one-to-one relationship, when the number of LED control channels increases, the number of terminals that need to be provided in the LED drive circuit also increases. Hence, the first scheme is not suitable for a case in which the number of control channels is remarkably large. A second scheme is, as schematically shown in FIG. 15, a scheme in which digital data is inputted to the LED drive circuit. In the second scheme, the LED drive circuit outputs an LED drive signal based on turn-on control data inputted as the digital data. The second scheme requires protocol control, and since there is no standard protocol for the scheme, a control protocol also needs to be changed depending on a change of an IC serving as the LED drive circuit.

FIG. 16 is a schematic diagram of a direct-type backlight that performs local dimming. The backlight includes an LED drive circuit 910; and an illuminating unit 920 in which multiple LEDs serving as light sources are mounted on a substrate. The substrate that constitutes the illuminating unit 920 is logically divided into a plurality of areas (in FIG. 16, 16 (four vertical×four horizontal) areas), and an LED unit 922 including one or more LEDs is provided in each area. Note that in the present specification it is assumed that each LED unit includes one LED. Therefore, in the example shown in FIG. 16, the illuminating unit 920 includes 16 LEDs 922.

Conventionally, the LEDs 922 in the illuminating unit 920 are individually driven. That is, as shown in a portion given reference character 94 in FIG. 17, channels for LED driving are provided for the respective areas. In this configuration, in a case in which the PWM dimming scheme is adopted, each LED 922 can be turned on for 100% of a period at the maximum in each frame period.

Meanwhile, in recent years, development of microscopic LEDs (such as LEDs called "mini-LEDs" and LEDs called "micro-LEDs") as compared to the conventional LEDs has become more active. It is expected that the number of area divisions when performing the local dimming is increased so as to enhance display quality by adopting a backlight using such microscopic LEDs. Regarding this, for example, in a case in which 2048 areas are provided, 128 LED drive circuits (LED driver ICs) each corresponding to 16 channels are required in order to individually drive LEDs, and thus, an area where the LED drive circuits are mounted remarkably increases. In addition, the number of wiring lines also becomes enormous. Therefore, in a case in which the number of area divisions is remarkably large, it is difficult to drive the LEDs individually. Hence, there is proposed time-sharing driving in which LEDs included in the illuminating unit are divided into a plurality of blocks and the LEDs are driven in a time-sharing manner and on a block-by-block basis. It should be noted that the time-sharing driving is also called passive driving.

The time-sharing driving of LEDs will be described with reference to FIG. 18. The time-sharing driving of LEDs is performed with wiring lines provided as schematically shown in FIG. 18. In the example shown in FIG. 18, each row constitutes one block and the LEDs 922 are driven on a row-by-row basis by switching of a switch 930. That is, one frame period is divided into four subframe periods T91 to T94 as shown in FIG. 19, and the LEDs are turned on row by row. Note that in FIG. 19, a period during which the LEDs 922 can be turned on is represented in white, and a period during which the LEDs 922 are turned off is represented in black (the same also applies to FIG. 20 and FIG. 8). As described above, in the time-sharing driving, one frame period is divided into a plurality of subframe periods, and during each subframe period, corresponding LEDs are turned on.

However, when the LEDs are driven as shown in FIG. 19, each LED blinks. Specifically, each LED blinks at a frequency of 60 Hz (at a cycle of 1/60 seconds). When the LEDs thus blink at a frequency of 60 Hz, flicker is visually recognized.

Note that a backlight that drives LEDs on a block-by-block basis is described in WO 2007/017797 A. Note also that Japanese Laid-Open Patent Publication No. 2011-13558 describes controlling of an LED turn-on cycle to optimize moving-image blur and flicker, though it is not an invention regarding the time-sharing driving of LEDs.

As a technique for suppressing the occurrence of flicker in the above-described time-sharing driving, turning on each LED a plurality of times during each frame (that is, increasing a lighting frequency of each LED) is considered. For example, in the backlight device having the configuration shown in FIG. 18, turning on each LED four times during each frame period as shown in FIG. 20 is considered. In this case, when the liquid crystal driving frequency is 60 Hz, the lighting frequency of LEDs is 240 Hz. Thus, the occurrence of flicker is suppressed.

In the meantime, in the liquid crystal display device that adopts a driving system called "pause driving", "low frequency driving", and so on, the liquid crystal driving frequency changes dynamically. In a case in which a method that turns on each LED four times during each frame period is adopted in such a liquid crystal display device, if the liquid crystal driving frequency changes from 60 Hz to 15 Hz, then the lighting frequency of LEDs changes from 240 Hz to 60 Hz. Since the lighting frequency of LEDs becomes 60 Hz, flicker occurs.

SUMMARY OF THE INVENTION

It is therefore desired to implement a backlight that can perform the time-sharing driving of LEDs so as not to cause flicker even when the driving frequency of the display panel changes dynamically.

(1) Backlights according to several embodiments of the present invention are each a backlight for a display panel, the backlight including a plurality of LEDs as light sources, and the backlight including:

a plurality of LED units divided into a plurality of blocks, each of the plurality of LED units including one or more LEDs, and a turn-on control circuit configured to turn on the plurality of LEDs in a time-sharing manner and on a block-by-block basis, wherein in regard to a first frequency and a second frequency which are two frequencies satisfying a following expression, when a driving frequency of the display panel changes from the first frequency to the second frequency, the turn-on control circuit increases a lighting frequency of the plurality of LEDs:

the first frequency>the second frequency.

According to such a configuration, in the backlight that turns on the LEDs in a time-sharing manner, the lighting frequency of the LEDs can be increased when the driving frequency of the display panel is reduced. Accordingly, the occurrence of flicker when the driving frequency of the display panel is reduced can be suppressed. As above, it is possible to implement the backlight that can perform the time-sharing driving of LEDs so as not to cause flicker even when the driving frequency of the display panel (such as the liquid crystal driving frequency) changes dynamically.

(2) Moreover, backlights according to several embodiments of the present invention are each a backlight including the configuration of above (1), wherein the turn-on control circuit includes a table that holds a correspondence relationship between the driving frequency of the display panel and the lighting frequency of the plurality of LEDs, and the turn-on control circuit determines the lighting frequency of the plurality of LEDs by referring to the table when the driving frequency of the display panel changes.

(3) Moreover, backlights according to several embodiments of the present invention are each a backlight including the configuration of above (2), wherein the correspondence relationship is held in the table such that when the driving frequency of the display panel becomes one-nth of that before change, the lighting frequency of the plurality of LEDs becomes n times of that before change.

(4) Moreover, backlights according to several embodiments of the present invention are each a backlight including the configuration of above (2), wherein the correspondence relationship is held in the table such that when the driving frequency of the display panel becomes lower than that before change, the lighting frequency of the plurality of LEDs becomes equal to or higher than that before change.

(5) Moreover, backlights according to several embodiments of the present invention are each a backlight including the configuration of above (2), wherein the turn-on control circuit includes a driving frequency detection unit configured to determine the driving frequency of the display panel based on a synchronization signal that are supplied from outside, and the driving frequency detection unit includes a timer, measures a length of one frame period based on the synchronization signal by using the timer, and determines the driving frequency of the display panel based on the length of one frame period that is a measurement result.

(6) Moreover, backlights according to several embodiments of the present invention are each a backlight including the configuration of above (1), wherein information on the lighting frequency of the plurality of LEDs is supplied from outside, and the turn-on control circuit turns on the plurality of LEDs based on the information.

(7) Moreover, backlights according to several embodiments of the present invention are each a backlight including the configuration of above (1), wherein the turn-on control circuit includes a power supply switching circuit configured to switch a supply destination of a power source voltage for LED driving among the plurality of blocks, and an LED drive circuit configured to control a time length for supplying an LED that is a lighting target with a current, by using a PWM signal, the LED drive circuit transmits a switching control signal to the power supply switching circuit based on the lighting frequency of the plurality of LEDs and the number of the plurality of blocks, and the power supply switching circuit switches the supply destination of the power source voltage among the plurality of blocks based on the switching control signal.

(8) Moreover, display devices according to several embodiments of the present invention are each a display device including:
a display panel including a display portion configured to display an image, and
a backlight configured to irradiate the display portion with light, the backlight including a plurality of LEDs as light sources, wherein
the backlight includes
a plurality of LED units divided into a plurality of blocks, each of the plurality of LED units including one or more LEDs, and
a turn-on control circuit configured to turn on the plurality of LEDs in a time-sharing manner and on a block-by-block basis, and
in regard to a first frequency and a second frequency which are two frequencies satisfying a following expression, when a driving frequency of the display panel changes from the first frequency to the second frequency, the turn-on control circuit increases a lighting frequency of the plurality of LEDs:
the first frequency>the second frequency.

These and other objects, features, aspects, and effects of the present invention will be made clearer from the following detailed description of the present invention with reference to the accompanying drawings.

BRIEF DESCRIPTION OF THE DRAWINGS

FIG. 5 is a diagram showing one example of a look-up table in the first embodiment.

FIG. 9 is a diagram showing one example of a look-up table in a variant of the first embodiment.

DETAILED DESCRIPTION OF PREFERRED EMBODIMENTS

Embodiments will be described below with reference to the accompanying drawings.
<1. First Embodiment>
<1.1 Overall Configuration>

Figure 2:
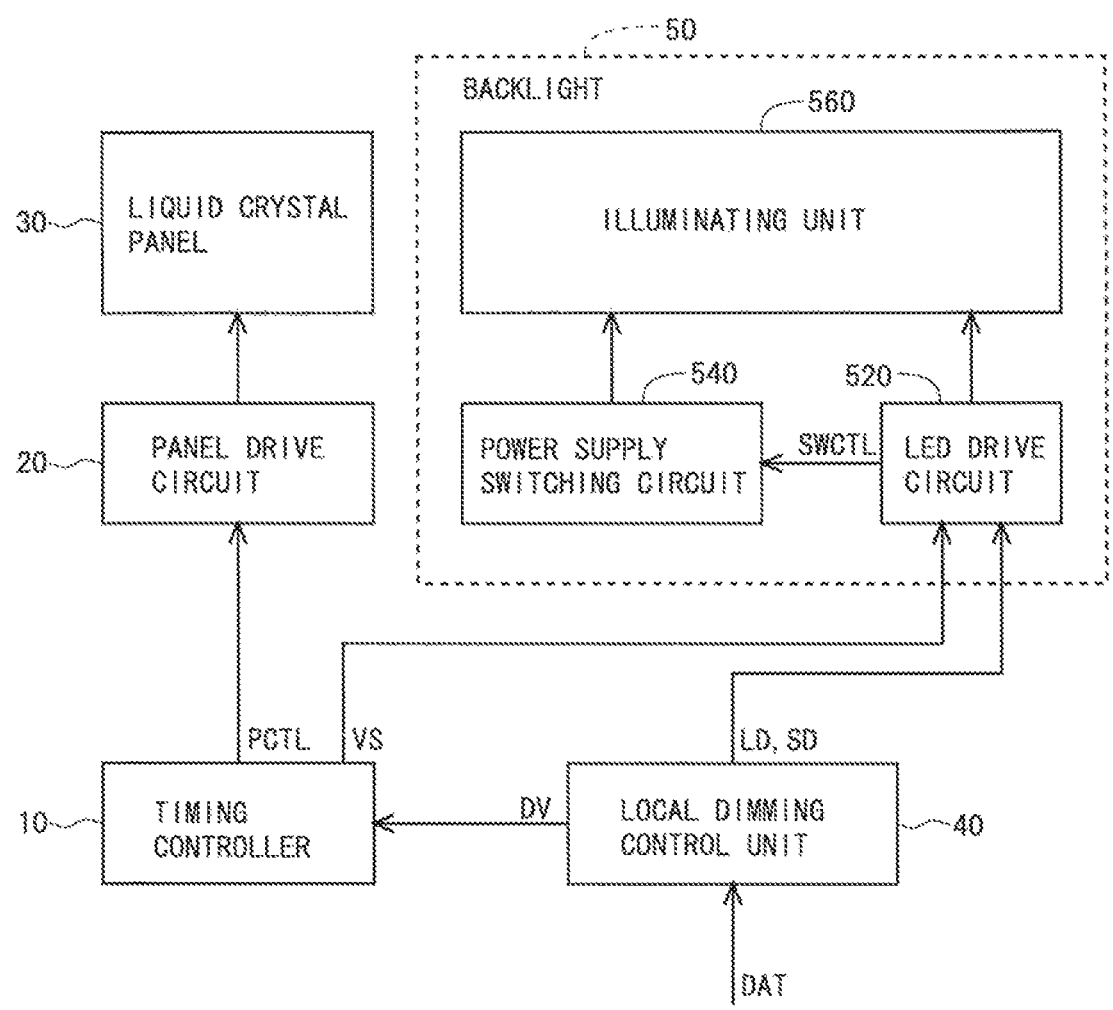
FIG. 2 is a block diagram showing an overall configuration of a liquid crystal display device in the first embodiment.

FIG. 2 is a block diagram showing an overall configuration of a liquid crystal display device according to a first embodiment. The liquid crystal display device includes a timing controller 10, a panel drive circuit 20, a liquid crystal panel 30, a local dimming control unit 40, and a backlight 50. The liquid crystal panel 30 is formed by two glass substrates facing each other and includes a display portion that displays an image. The backlight 50 is provided on the back of the liquid crystal panel 30. The backlight 50 includes an LED drive circuit (LED driver IC) 520, a power supply switching circuit 540, and an illuminating unit 560. The illuminating unit 560 includes a plurality of LEDs which are provided on a substrate (an LED substrate). Regarding this, the LED substrate is logically divided into a plurality of areas, and one LED is mounted on the LED substrate for each area. However, in some cases, a plurality of LEDs are mounted on the LED substrate for each area. That is, in the illuminating unit 560, an LED unit including one or more LEDs is provided for each area. The PWM dimming scheme is adopted as an LED dimming scheme. It should be noted that the LED power source described later is omitted in FIG. 2.

In the meantime, the backlight 50 according to the present embodiment adopts the time-sharing driving in which the LEDs are driven on a block-by-block basis. Regarding this, in the present embodiment, the plurality of LEDs in the illuminating unit 560 are divided into four blocks.

Figure 3:
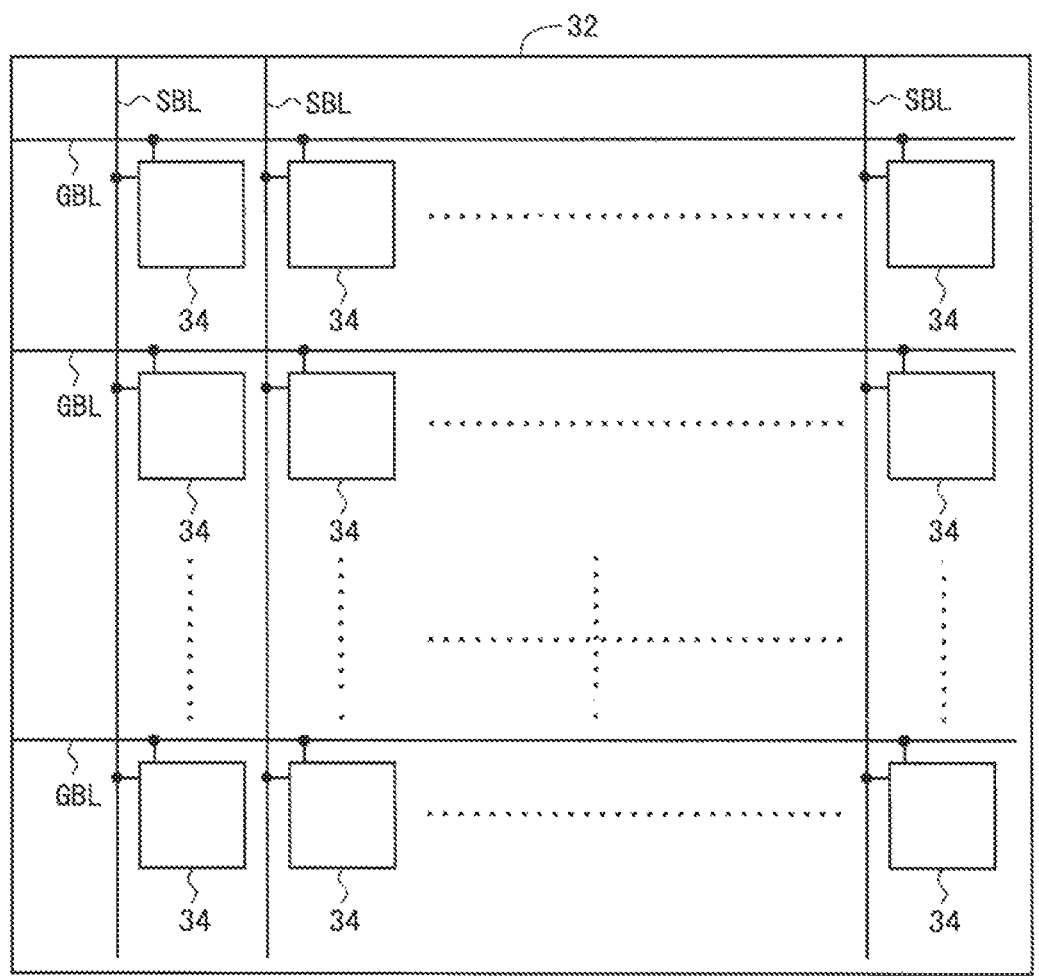
FIG. 3 is a diagram for describing a configuration of a display portion in the first embodiment.

In the display portion 32 in the liquid crystal panel 30, as shown in FIG. 3, a plurality of gate bus lines GBL and a plurality of source bus lines SBL are disposed. Pixel portions 34 are provided at the respective intersections of the plurality of gate bus lines GBL and the plurality of source bus lines SBL. That is, the display portion 32 includes a plurality of pixel portions 34. The plurality of pixel portions 34 are arranged in a matrix form, forming a pixel matrix. Each pixel portion 34 includes a pixel capacitance.

The operation of each of the components shown in FIG. 2 will be described. The local dimming control unit 40 receives image data DAT transmitted from an external source, and outputs turn-on control data LD for controlling the luminance of each LED and operation setting data SD for specifying the operation of the LED drive circuit 520 so as to perform the above-described local dimming (a process of controlling the luminances of the LEDs on an area-by-area basis). Furthermore, the local dimming control unit 40 performs a correction process on the image data DAT based on the turn-on states of the LEDs, and outputs corrected image data DV to the timing controller 10. Note that, in the correction process, liquid crystal data which is one of panel control signals PCTL is corrected so as to obtain the same luminance as that represented by input image data (image data DAT). Specifically, when an LED is darkened, the liquid crystal data is corrected to increase transmittance, and when an LED is lightened, the liquid crystal data is corrected to reduce transmittance.

The timing controller 10 receives the above-described corrected image data DV, and outputs panel control signals PCTL to the panel drive circuit 20 and a vertical synchronization signal VS to the LED drive circuit 520.

The panel drive circuit 20 drives the liquid crystal panel 30 based on the panel control signals PCTL transmitted from the timing controller 10. Specifically, the panel drive circuit 20 includes a gate driver that drives the gate bus lines GBL and a source driver that drives the source bus lines SBL. By the gate driver driving the gate bus lines GBL and the source driver driving the source bus lines SBL, a voltage determined based on a target display image is written to the pixel capacitance in each pixel portion 34.

The LED drive circuit 520 drives each LED based on the turn-on control data LD and the operation setting data SD which are transmitted from the local dimming control unit 40 and the vertical synchronization signal VS that is transmitted from the timing controller 10, such that the LEDs in the illuminating unit 560 emit light at their desired luminances. Further, the LED drive circuit 520 outputs a switching control signal SWCTL for the time-sharing driving to the power supply switching circuit 540. The power supply switching circuit 540 switches the supply destination of the power source voltage for LED driving, in a time-sharing manner, among a plurality of blocks in each frame period based on the switching control signal SWCTL that is transmitted from the LED drive circuit 520. It should be noted that, since four blocks exist in the present embodiment as described above, the power supply switching circuit 540 switches the supply destination of the power source voltage, in a time-sharing manner, among four blocks in each frame period based on the switching control signal SWCTL.

The illuminating unit 560 includes the LEDs (LED units) provided for the respective areas, and each LED emits light at a desired luminance based on the control by the LED drive circuit 520 and the power supply switching circuit 540. In this manner, the illuminating unit 560 irradiates the display portion 32 with light from the back of the display portion 32.

In the above-described manner, the illuminating unit 560 in the backlight 50 irradiates the display portion 32 with light from the back of the display portion 32, with a voltage, which is determined based on a target display image, written to the pixel capacitance in each pixel portion 34 provided in the display portion 32 of the liquid crystal panel 30, by which a desired image is displayed on the display portion 32.

It should be noted that, in regard to the backlight 50, the turn-on control circuit is implemented by the LED drive circuit 520 and the power supply switching circuit 540 in the present embodiment.

<1.2 Backlight>
<1.2.1 Schematic Configuration>

Figure 4:
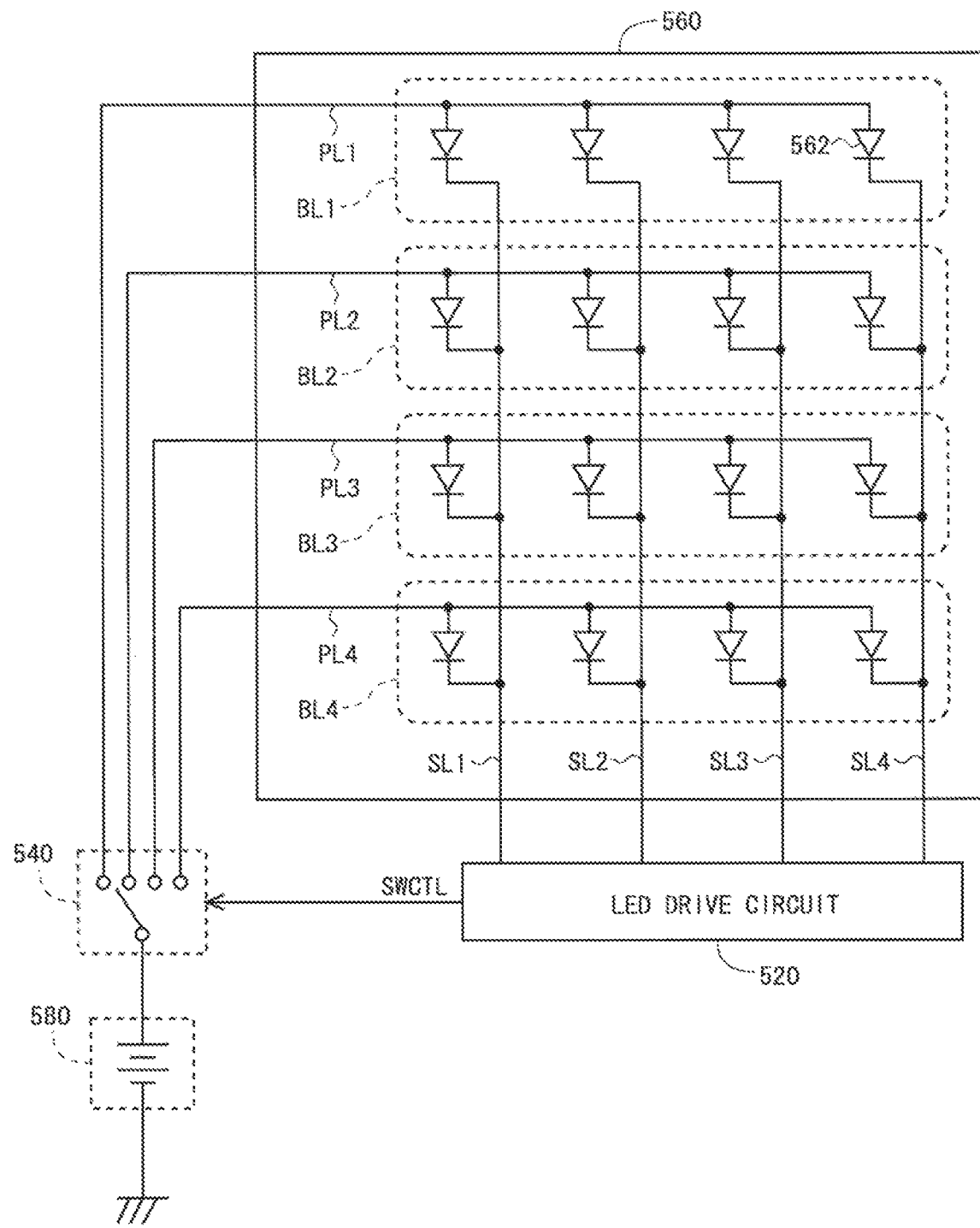
FIG. 4 is a block diagram for describing a schematic configuration of a backlight in the first embodiment.

FIG. 4 is a block diagram for describing a schematic configuration of the backlight 50. As shown in FIG. 4, the backlight 50 includes the LED drive circuit 520, the power supply switching circuit 540, the illuminating unit 560, and an LED power source 580. Here, for convenience of description, it is assumed that the substrate (LED substrate) that constitutes the illuminating unit 560 is logically divided into 16 (four vertical×four horizontal) areas. However, in general, the number of areas are contemplated to be equal or more than 1000 (for example, 1152 (24×48)).

In the illuminating unit 560, four power source lines PL1 to PL4 extending in the horizontal direction in FIG. 4 and four turn-on control lines SL1 to SL4 extending in the vertical direction in FIG. 4 are disposed. Each of the intersections of the four power source lines PL1 to PL4 and the four turn-on control lines SL1 to SL4 corresponds to one area, and one LED 562 is provided for each one of the 16 areas. In this manner, the illuminating unit 560 includes 16 LEDs 562. These 16 LEDs are divided into four blocks (the first block BL1 to the fourth block BL4) as shown in FIG. 4. By switching the supply destination of the power source voltage by the power supply switching circuit 540, 16 LEDs 562 are driven on a block-by-block basis (on a row-by-row basis in the present embodiment).

In the present embodiment, since four LEDs 562 are included in one block, four channels (four turn-on control lines SL1 to SL4) are provided as channels for LED driving.

In the configuration such as described above, driving (turning on the LEDs 562 in the block) is performed, for example, at the first block BL1, at the second block BL2, at the third block BL3, and at the fourth block BL4 in this order in each frame period. At this time, the luminance of each LED 562 is controlled by the LED drive circuit 520.

<1.2.2 LED Drive Circuit>

Figure 1:
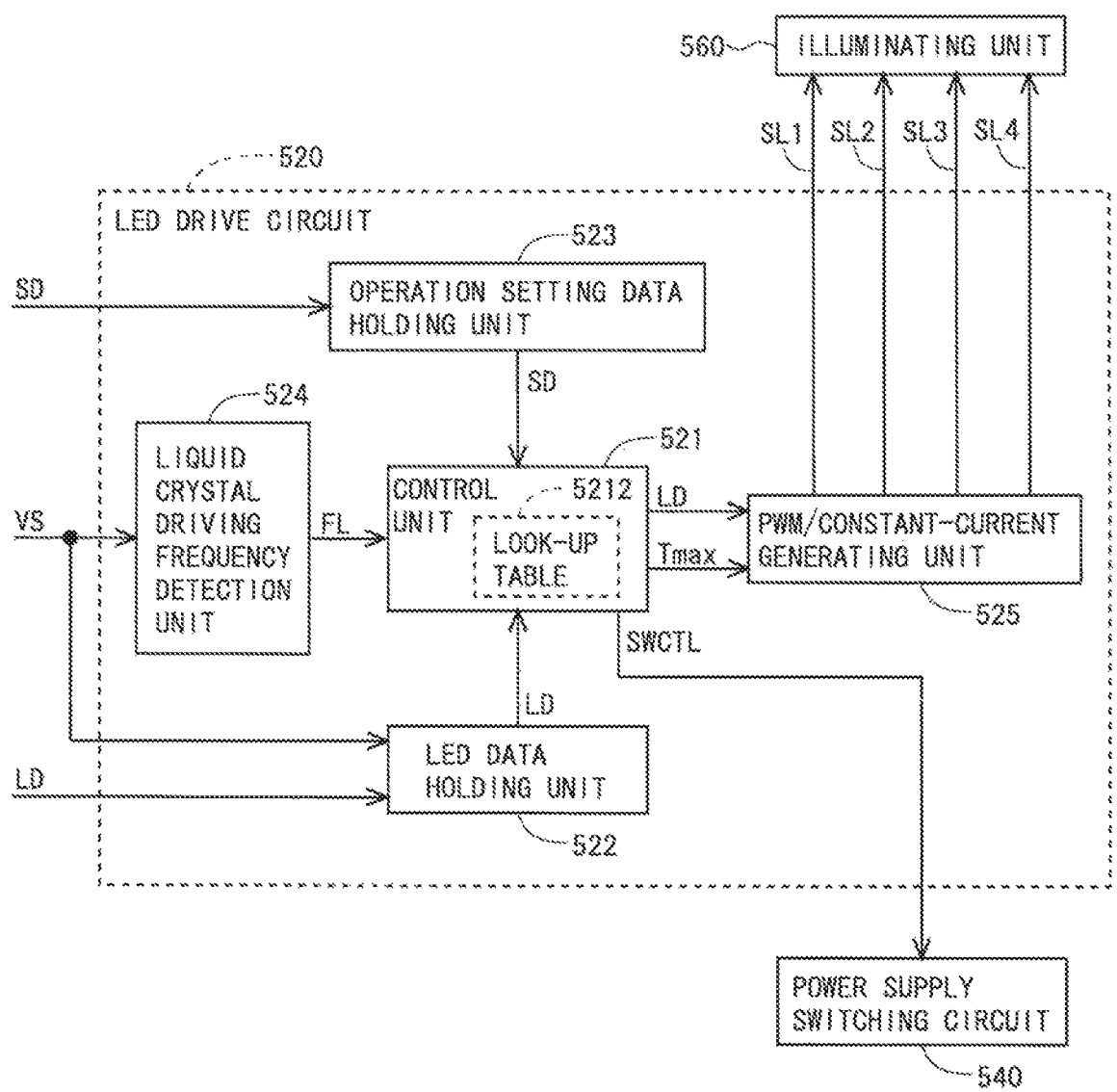
FIG. 1 is a block diagram showing a functional configuration of an LED drive circuit in a first embodiment.

FIG. 1 is a block diagram showing a functional configuration of the LED drive circuit 520 in the present embodiment. The LED drive circuit 520 includes, as shown in FIG. 1, a control unit 521, an LED data holding unit 522, an operation setting data holding unit 523, a liquid crystal driving frequency detection unit 524, and a PWM/constant-current generating unit 525.

The LED data holding unit 522 is configured, for example, by a volatile register and holds the turn-on control data LD corresponding to respective LEDs 562 in the illuminating unit 560. The turn-on control data LD is transmitted to the LED drive circuit 520 via a serial bus such as an Inter-Integrated Circuit (I2C) or a Serial Peripheral Interface (SPI). The turn-on control data LD transmitted to the LED drive circuit 520 includes address information, and the turn-on control data LD (information on the luminance of an LED 562) is written to a corresponding register in the LED data holding unit 522 based on the address information. It should be noted that, exactly, the register for holding each turn-on control data LD is configured by a register for writing and a register for reading, and the turn-on control data LD written in the register for writing is transferred to the register for reading based on the vertical synchronization signal VS. Then, the turn-on control data LD is read out from the register for reading by the control unit 521. It should be noted that the LED data holding unit 522 may be configured by a memory.

Meanwhile, each register constituting the LED data holding unit 522 is, for example, eight bits. In this case, for example, the fact that the value held in a register is 255 indicates that an LED 562 corresponding to the register should be turned on at a duty ratio of 100%, and the fact that the value held in a register is 127 indicates that an LED 562 corresponding to the register should be turned on at a duty ratio of 50%.

The operation setting data holding unit 523 is configured, for example, by a volatile register and holds the operation setting data SD specifying the operation of this LED drive circuit 520. Like the turn-on control data LD, the operation setting data SD is also transmitted to the LED drive circuit 520 via a serial bus such as an I2C or a SPI. In the present embodiment, the operation setting data SD includes at least information on the number of blocks. It should be noted that the operation setting data SD is supplied from the local dimming control unit 40 to the LED drive circuit 520 at a timing, for example, immediately after start-up of the liquid crystal display device.

The liquid crystal driving frequency detection unit 524 has a timer. The liquid crystal driving frequency detection unit 524 receives the vertical synchronization signal VS transmitted from the timing controller 10, measures a length of one frame period based on the vertical synchronization signal VS by using the timer, and determines the liquid crystal driving frequency (the driving frequency of the display panel) FL based on the measurement result (the length of one frame period). Information on the liquid crystal driving frequency FL is supplied from the liquid crystal driving frequency detection unit 524 to the control unit 521.

The control unit 521 determines the lighting frequency of the LEDs 562 based on the information on the liquid crystal driving frequency FL supplied from the liquid crystal driving frequency detection unit 524. In order to realize this, in the present embodiment, the control unit 521 includes a look-up table 5212 that holds a correspondence relationship between the liquid crystal driving frequency and the lighting frequency of the LEDs 562, schematically as shown in FIG. 5. When the liquid crystal driving frequency changes, the lighting frequency of the LEDs 562 is changed based on this look-up table 5212. In the example shown in FIG. 5, when the liquid crystal driving frequency becomes one-nth of that before change, the lighting frequency of the LEDs 562 becomes n times of that before change. Specifically, when the liquid crystal driving frequency is 60 Hz, the lighting frequency of the LEDs 562 is 240 Hz. Further, if the liquid crystal driving frequency is changed to 30 Hz from such a state, then the lighting frequency of the LEDs 562 is changed to 480 Hz. As above, the control unit 521 determines the lighting frequency of the LEDs 562 by referring to the look-up table 5212 based on the information on the liquid crystal driving frequency FL supplied from the liquid crystal driving frequency detection unit 524. Although the lighting frequency of the LEDs 562 is an integer multiple of the liquid crystal driving frequency in the example shown in FIG. 5, the lighting frequency of the LEDs 562 is not limited to this. In addition, because flicker is more visible as the liquid crystal driving frequency is lower, it is preferable to increase the lighting frequency of the LEDs 562 as the liquid crystal driving frequency is lower.

In the meantime, in the present embodiment, while the LED data holding unit 522 holds the turn-on control data LD corresponding to 16 LEDs 562, it is required to read out four pieces of turn-on control data LD from the LED data holding unit 522 at one time in order to perform the time-sharing driving (in order to turn on the LEDs 562 on a block-by-block basis) at this backlight 50. Accordingly, at an inside of the control unit 521, the switching control signal SWCTL for switching the register that is the read destination of the turn-on control data LD is generated based on a maximum turn-on time (a maximum time during which each LED 562 is capable of lighting by a single driving operation) Tmax that is obtained as described later. It should be noted that this switching control signal SWCTL is also used for switching the supply destination of the power source voltage by the power supply switching circuit 540.

Here, when the number of blocks is NB and the lighting frequency of the LEDs 562 is FB, the maximum turn-on time is obtained by the following equation (1).

$$Tmax=1/(NB \times FB) \quad (1)$$

In a case in which the lighting frequency of the LEDs 562 is 480 Hz in the example of the present embodiment, the maximum turn-on time is obtained by the following equation (2).

$$Tmax=1/(4 \times 480) \quad (2)$$

In the control unit 521, based on the lighting frequency determined by referring to the look-up table 5212 as described above and the information on the number of blocks included in the operation setting data SD, the maximum turn-on time Tmax is obtained by the above equation (1). Then, the control unit 521 generates the switching control signal SWCTL based on the maximum turn-on time Tmax and reads out the turn-on control data LD for LEDs which are lighting targets from the LED data holding unit 522 based on the switching control signal SWCTL. Further, the control unit 521 controls the operation of the PWM/constant-current generating unit 525 based on the read turn-on control data LD and the maximum turn-on time Tmax. Furthermore, the control unit 521 outputs the switching control signal SWCTL to the power supply switching circuit 540. By this, the supply destination of the power source voltage can be switched every desired time in the power supply switching circuit 540.

Figure 6:
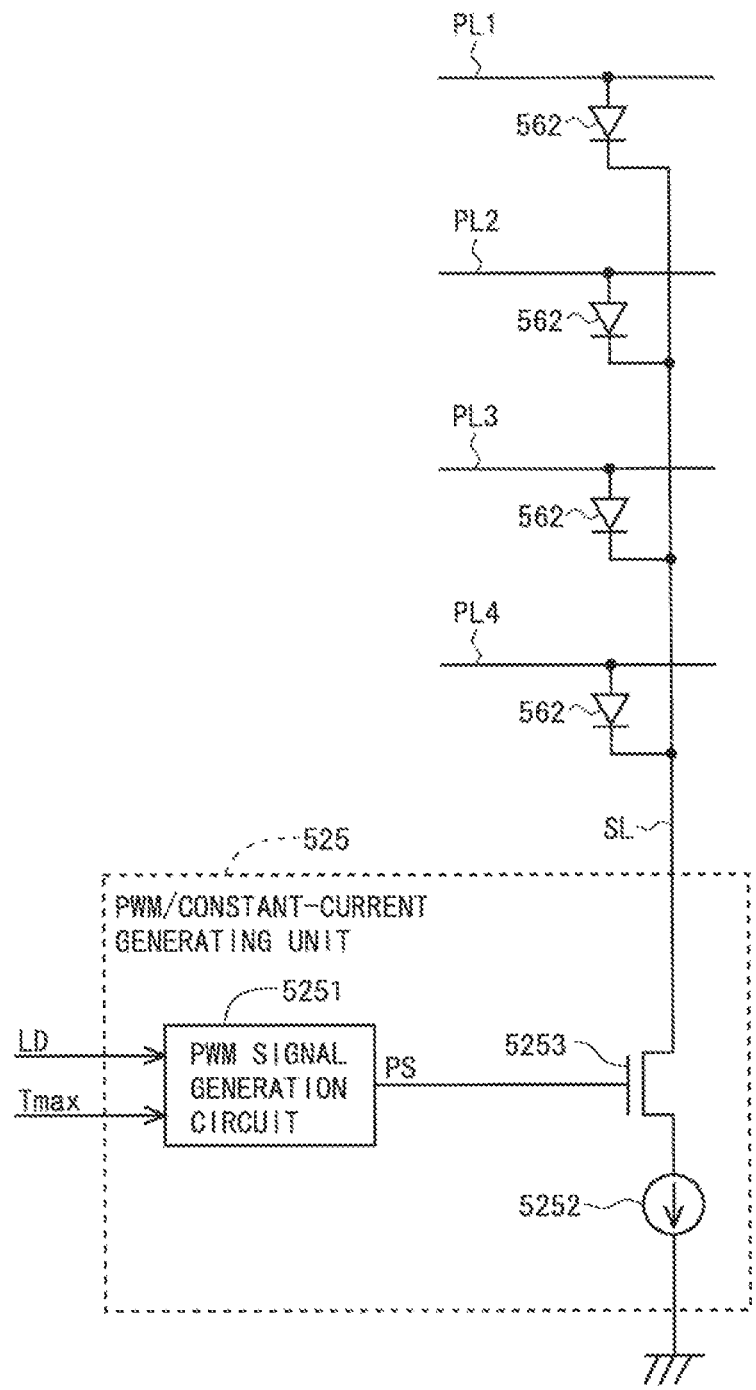
FIG. 6 is a schematic diagram showing only components corresponding to one column of a PWM/constant-current generating unit in the first embodiment.

In regard to the PWM/constant-current generating unit 525, description is made with reference to FIG. 6. FIG. 6 is a schematic diagram showing only components corresponding to one column of the PWM/constant-current generating unit 525. As shown in FIG. 6, the PWM/constant-current generating unit 525 includes a PWM signal generation circuit 5251, a constant current source 5252, and a switch (a transistor) 5253. The constant current source 5252 functions such that the constant current flows through the turn-on control line SL. Regarding the switch 5253, switching between an ON state and an OFF state is performed based on the PWM signal PS outputted from the PWM signal generation circuit 5251. In the present embodiment, the switch 5253 is in the ON state when the PWM signal PS is at a high level, and the switch 5253 is in the OFF state when the PWM signal PS is at a low level. When the switch 5253 is in the ON state, the constant current flows through a corresponding turn-on control line SL (however, it is assumed that the power source voltage is supplied to any of the power source lines PL). When the switch 5253 is in the OFF state, the constant current does not flow through the corresponding turn-on control line SL. The PWM signal generation circuit 5251 generates the PWM signal PS based on the turn-on control data LD and the maximum turn-on time Tmax. For example, when the turn-on control data LD is a data corresponding to a duty ratio of 50%, the PWM signal generation circuit 5251 generates the PWM signal PS that is maintained at the high level only a period of half of the maximum turn-on time Tmax. By the above operation, the LED 562 that is a lighting target emits light with luminance depending on a pulse width of the PWM signal PS.

Although the functional configuration of the LED drive circuit 520 has been described in detail in the above, the functional configuration thereof is not limited to this. As long as a look-up table that holds a correspondence relationship between the liquid crystal driving frequency and the lighting frequency of the LEDs 562 are held and the liquid crystal driving frequency FL can be obtained based on the synchronization signal such as the vertical synchronization signal VS, the configuration of the LED drive circuit 520 is not particularly limited.

<1.2.3 Operation Example>

Next, with reference to FIG. 7 and FIG. 8, an operation example will be described. It should be noted that, in FIG. 7, each arrow given reference character 6 schematically represents the state in which writing to the pixel capacitance is performed from the first row to the last row. Moreover, in FIG. 7, each arrow given reference character Ta represents a length of one frame period corresponding to the liquid crystal driving frequency of 60 Hz and each arrow given reference character Tb represents a length of one frame period corresponding to the liquid crystal driving frequency of 30 Hz.

Figure 7:
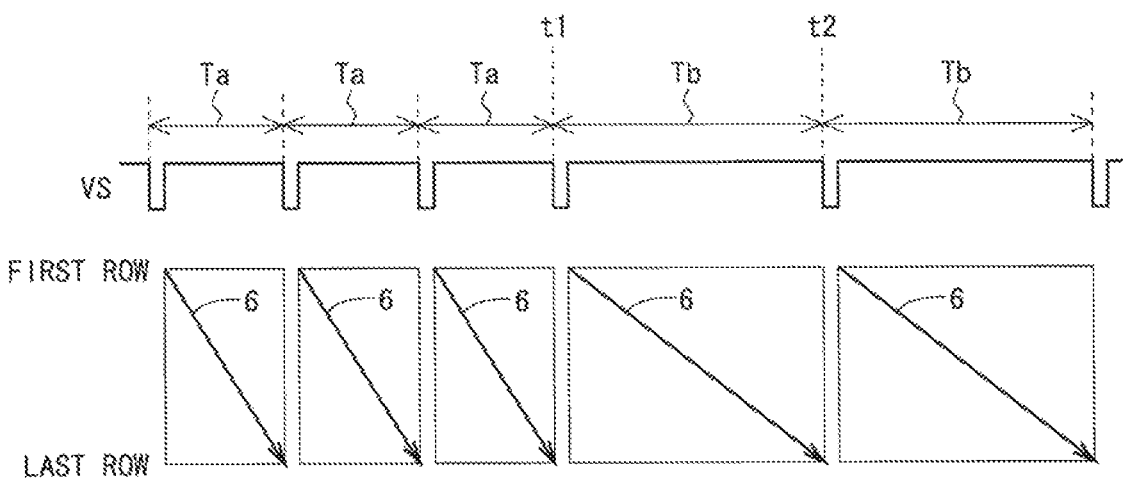
FIG. 7 is a diagram for describing an operation example in the first embodiment.

In the example shown in FIG. 7, during a period before time t1, the liquid crystal driving frequency is 60 Hz. It should be noted that, in the LED drive circuit 520, a length of one frame period is obtained by measuring a length of a period from a timing of falling of the vertical synchronization signal VS to a timing of next falling of the vertical synchronization signal VS, and then the liquid crystal driving frequency is determined based on the obtained length.

When time t1 comes, the liquid crystal driving frequency is changed from 60 Hz to 30 Hz. At time point of time t1, a change of the liquid crystal driving frequency is not detected in the LED drive circuit 520. When time t2 comes, the change of the liquid crystal driving frequency is detected in the LED drive circuit 520 based on a length of a period from time t1 to time t2. Then, the LED drive circuit 520 determines the lighting frequency of the LEDs 562 after change by referring to the above-described look-up table 5212. In this example, since the liquid crystal driving frequency is changed to 30 Hz, the lighting frequency of the LEDs 562 is determined to be 480 Hz by referring to the look-up table 5212 (see FIG. 5). Then, after time t2, the LEDs 562 in the illuminating unit 560 are turned on with a lighting frequency of 480 Hz.

Figure 8:
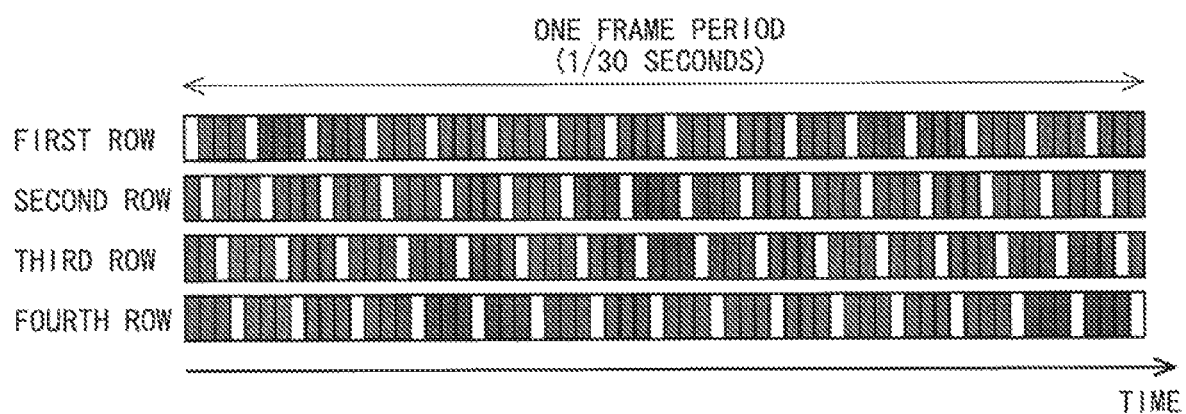
FIG. 8 is a diagram for describing the operation example in the first embodiment.
Figure 20:
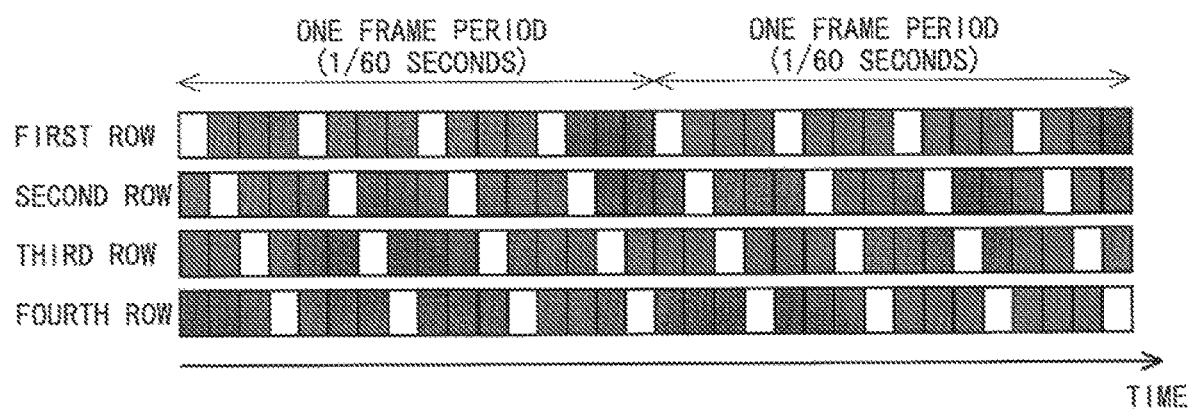
FIG. 20 is a diagram for describing the time-sharing driving of LEDs (a case in which each LED is turned on four times during each frame period) regarding the conventional example.

As above, the LEDs 562 which are driven as shown in FIG. 20 before time t2 are driven as shown in FIG. 8 after time t2. After time t2, since the liquid crystal driving frequency is 30 Hz, a length of one frame period is 1/30 seconds. Further, after time t2, since the lighting frequency of the LEDs 562 is 480 Hz (that is, 16 times the liquid crystal driving frequency), each LED 562 is turned on 16 times during each frame period.

<1.3 Advantageous Effects>

According to the present embodiment, the LED drive circuit 520 in the backlight 50 is provided with the liquid crystal driving frequency detection unit 524 that determines the liquid crystal driving frequency based on the vertical synchronization signal VS. In addition, the control unit 521 in the LED drive circuit 520 is provided with the look-up table 5212 that holds a correspondence relationship between the liquid crystal driving frequency and the lighting frequency of the LEDs 562. Therefore, it is possible to change the lighting frequency of the LEDs 562 depending on change in the liquid crystal driving frequency. Here, the look-up table 5212 holds the correspondence relationship such that the lighting frequency of the LEDs 562 is increased as the liquid crystal driving frequency is lower. Accordingly, even when the liquid crystal driving frequency becomes lower, flicker does not occur since the LEDs 562 in the illuminating unit 560 are turned on with a high frequency. As above, according to the present embodiment, it is possible to implement the backlight 50 that can perform the time-sharing driving of LEDs 562 so as not to cause flicker even when the liquid crystal driving frequency changes dynamically.

<1.4 Variant>

In the above-described first embodiment, the look-up table 5212 holds the correspondence relationship such that when the liquid crystal driving frequency becomes one-nth of that before change, the lighting frequency of the LEDs 562 becomes n times of that before change. However, the correspondence relationship is not limited to this. For example, as shown in FIG. 9, the look-up table 5212 may hold the correspondence relationship such that when the liquid crystal driving frequency becomes lower than that before change, the lighting frequency of the LEDs 562 becomes equal to or higher than that before change.

In the example shown in FIG. 9, even when the liquid crystal driving frequency changes from 120 Hz to 60 Hz, the lighting frequency of the LEDs 562 is maintained at 240 Hz. Further, for example, when the liquid crystal driving frequency changes from 60 Hz to 15 Hz, the lighting frequency of the LEDs 562 is changed from 240 Hz to 960 Hz.

<2. Second Embodiment>

A second embodiment will be described. It should be noted that, in the following, only differences from the first embodiment will be mainly described.

<2.1 Configuration>

Figure 10:
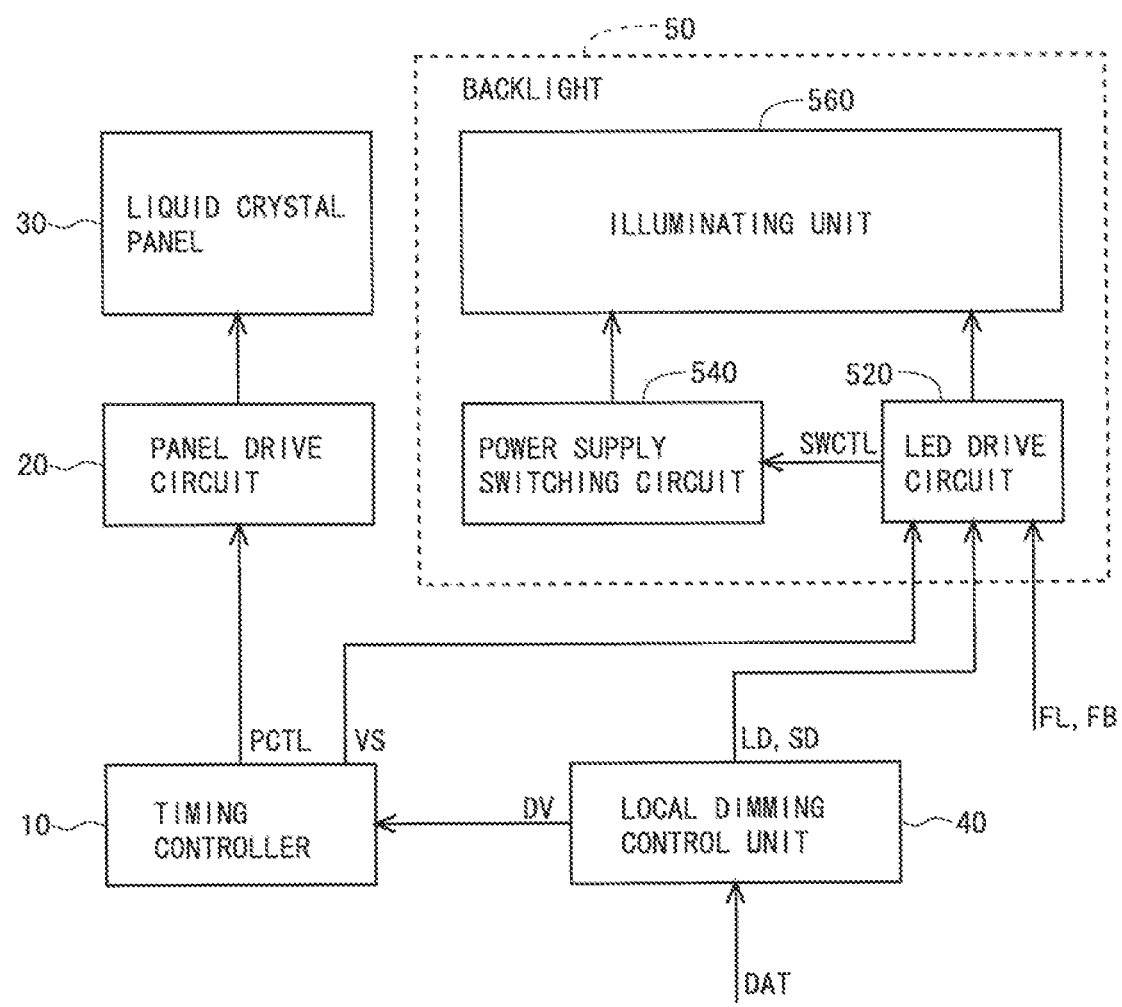
FIG. 10 is a block diagram showing an overall configuration of a liquid crystal display device in a second embodiment.

FIG. 10 is a block diagram showing an overall configuration of a liquid crystal display device according to the second embodiment. In the present embodiment, information on the liquid crystal driving frequency FL and information on the lighting frequency FB of the LEDs are transmitted from an external source (for example, a host) to the LED drive circuit 520 via a serial bus such as an I2C or a SPI. Based on these information, the LED drive circuit 520 turns on the LEDs 562 in the illuminating unit 560 on a block-by-block basis.

Figure 11:
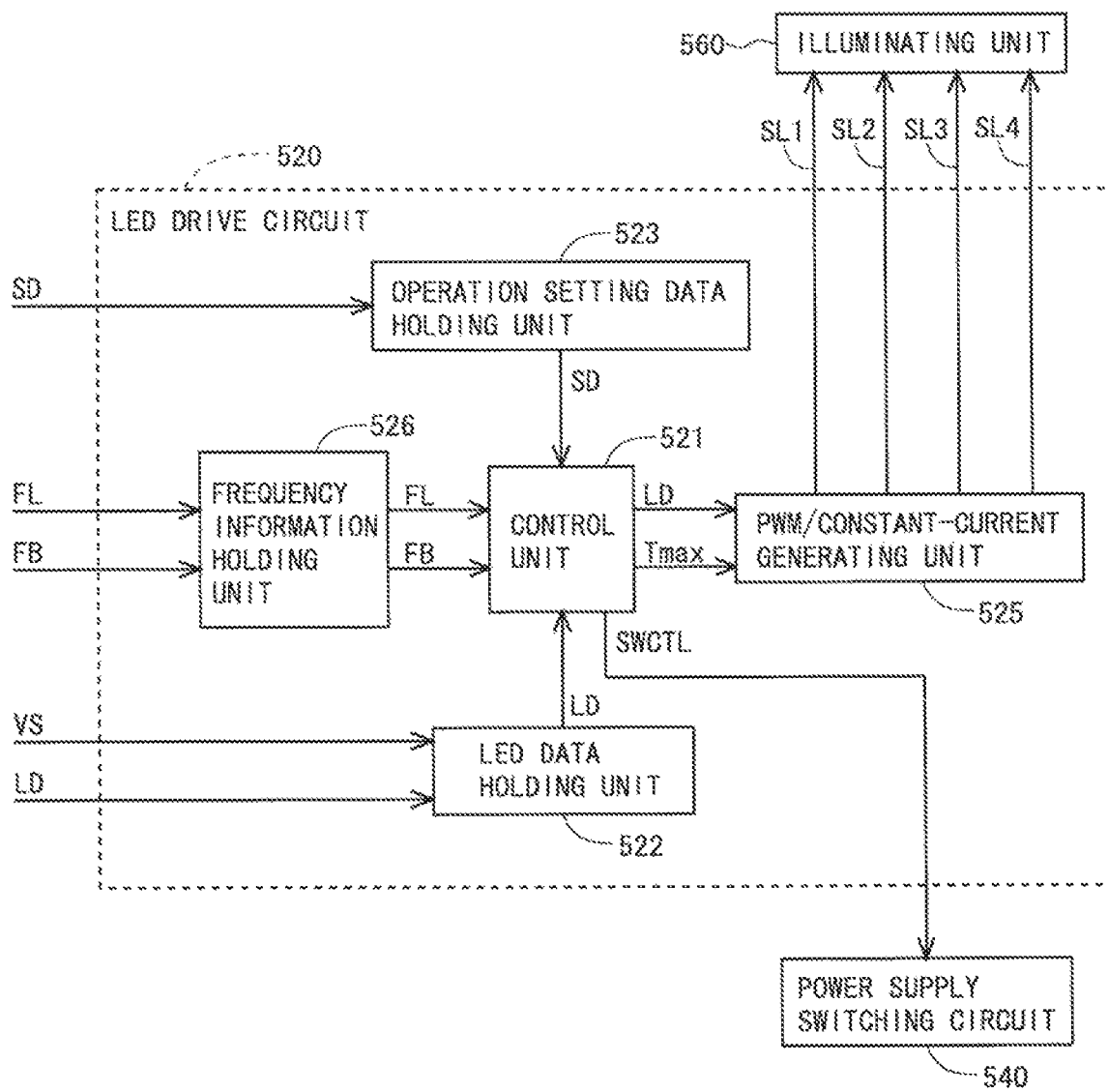
FIG. 11 is a block diagram showing a functional configuration of an LED drive circuit in the second embodiment.
Figure 12:
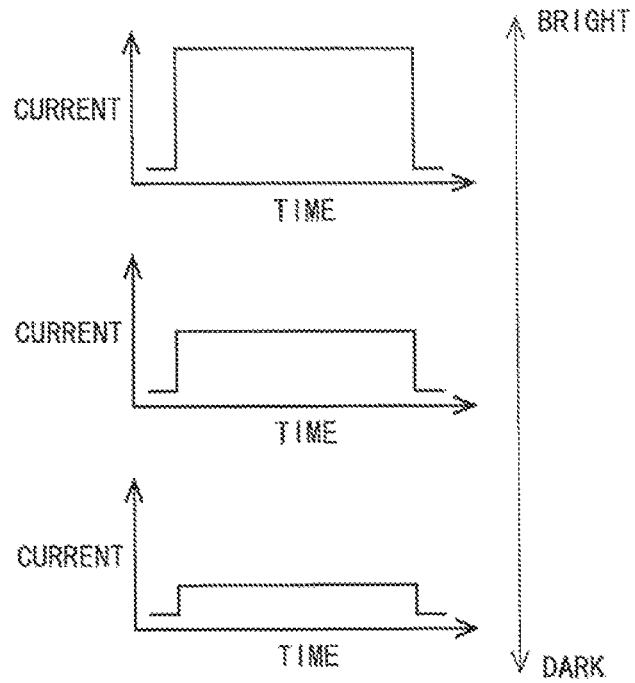
FIG. 12 is a diagram for describing an analog dimming scheme regarding a conventional example.
Figure 13:
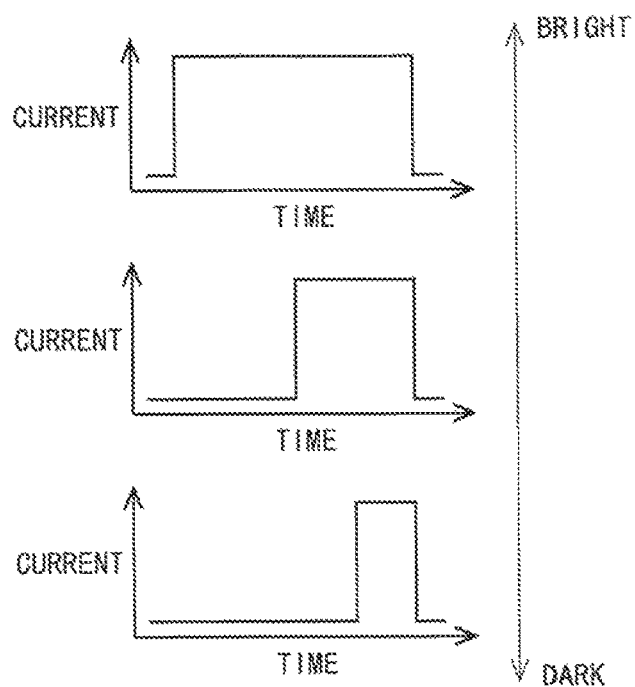
FIG. 13 is a diagram for describing a PWM dimming scheme regarding the conventional example.
Figure 14:
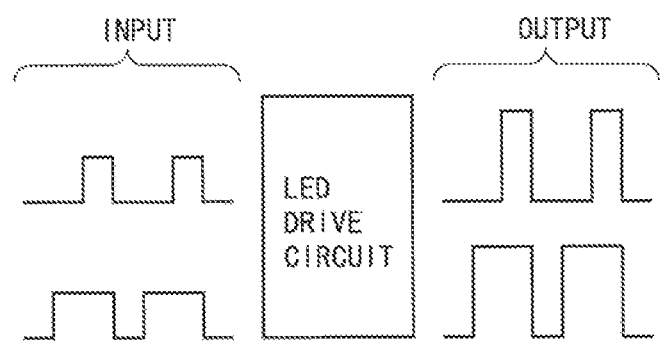
FIG. 14 is a diagram for describing a first scheme for an interface of an LED drive circuit regarding the conventional example.
Figure 15:
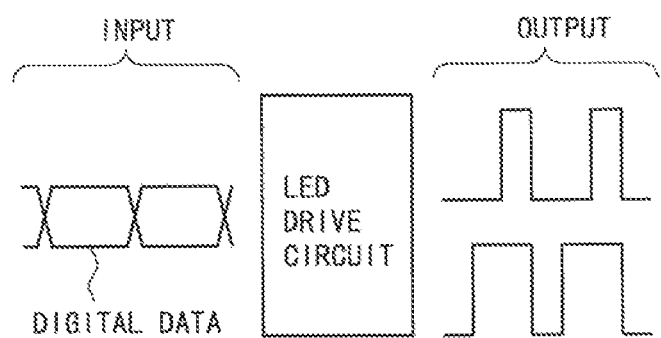
FIG. 15 is a diagram for describing a second scheme for the interface of the LED drive circuit regarding the conventional example.
Figure 16:
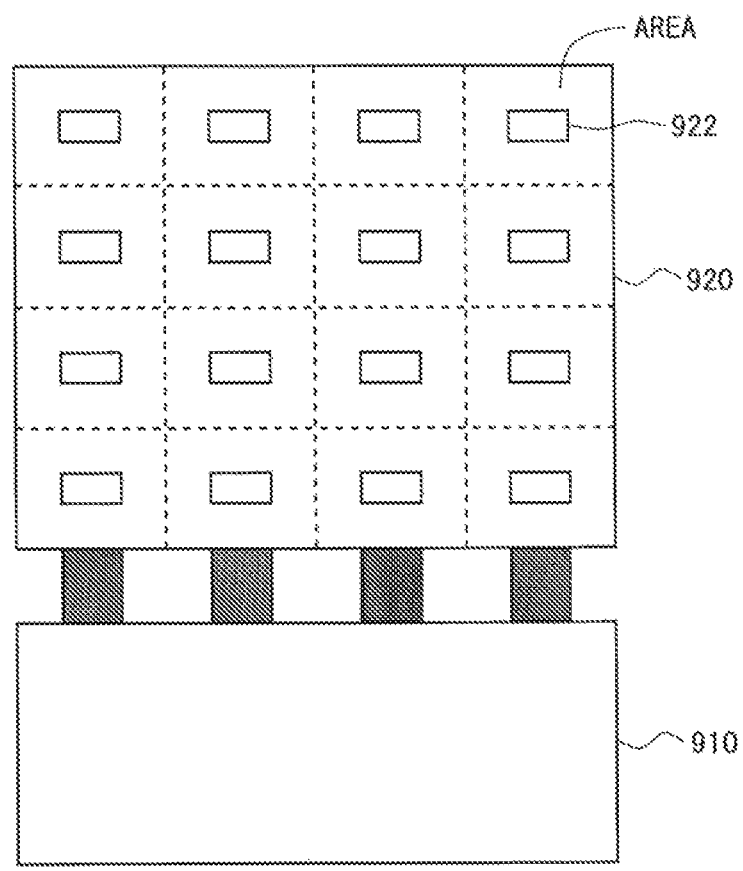
FIG. 16 is a schematic diagram of a direct-type backlight that performs local dimming regarding the conventional example.
Figure 17:
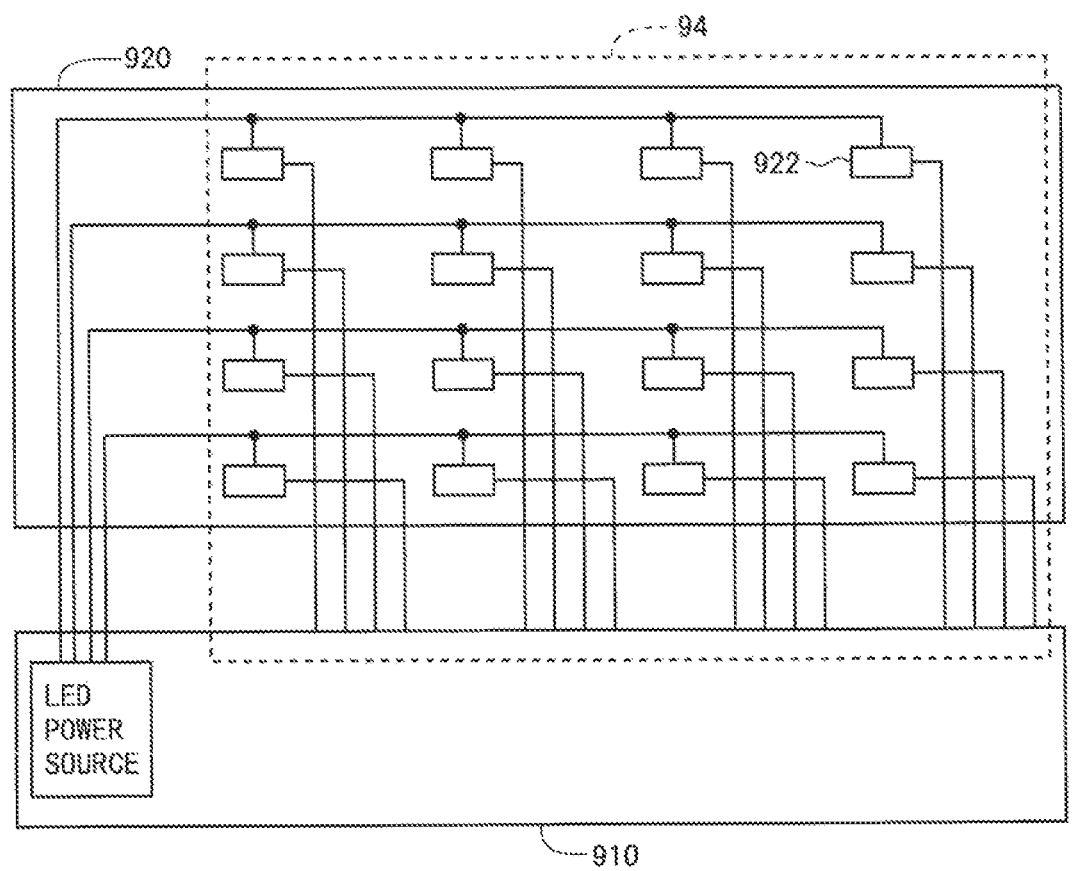
FIG. 17 is a diagram schematically showing a state of wiring lines for a case of individually driving LEDs regarding the conventional example.
Figure 18:
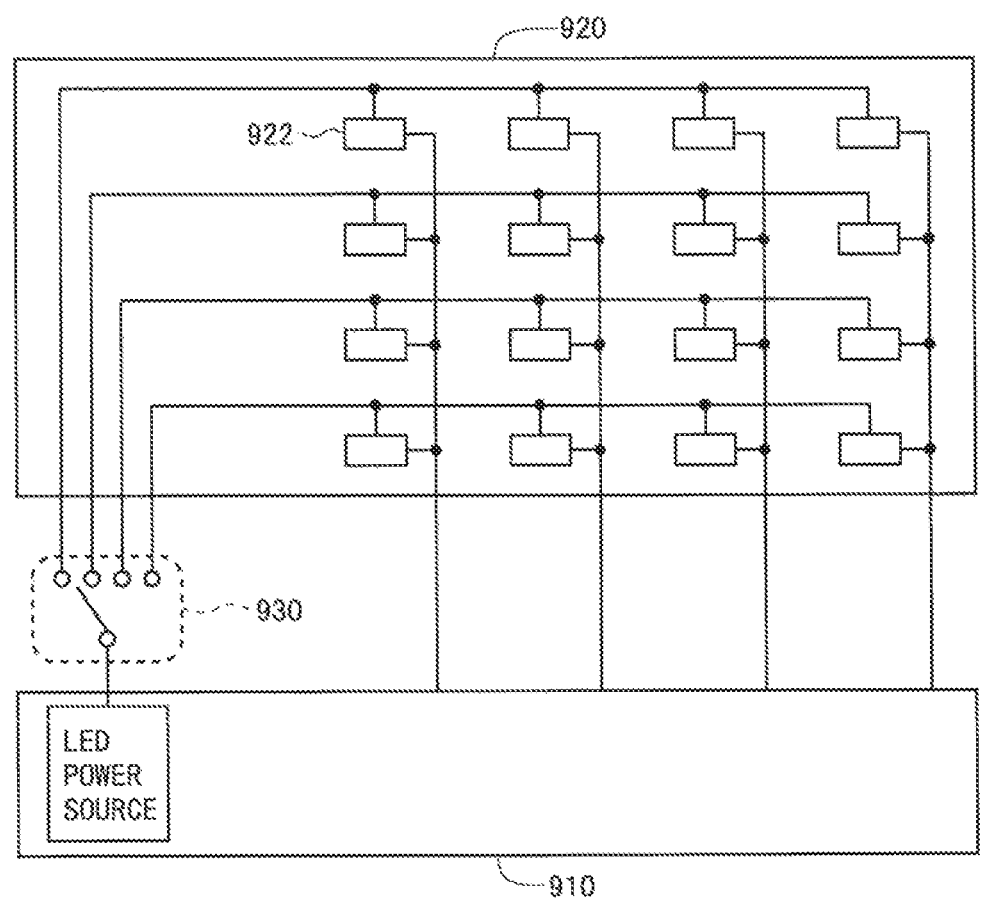
FIG. 18 is a diagram schematically showing a state of wiring lines for a case of performing the time-sharing driving of LEDs regarding the conventional example.
Figure 19:
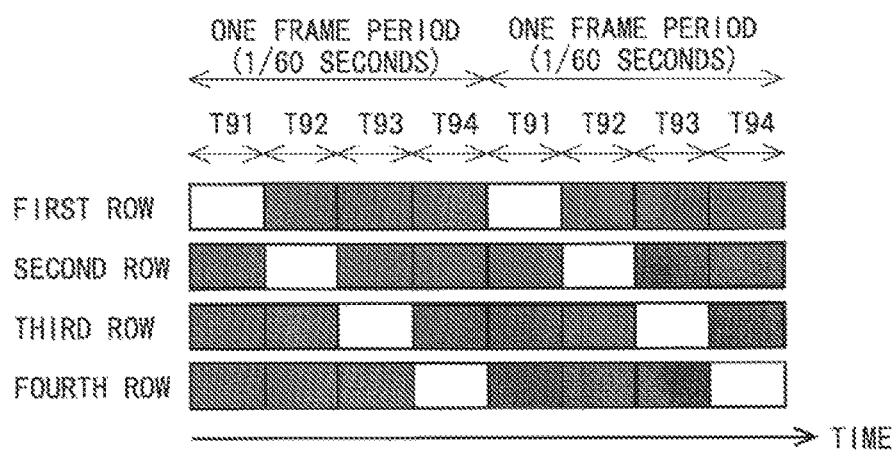
FIG. 19 is a diagram for describing the time-sharing driving of LEDs (a case in which each LED is turned on only once during each frame period) regarding the conventional example.

FIG. 11 is a block diagram showing a functional configuration of the LED drive circuit 560 in the present embodiment. The LED drive circuit 560 in the present embodiment is provided with a frequency information holding unit 526 in place of the liquid crystal driving frequency detection unit 524 in the first embodiment. This frequency information holding unit 526 is configured by a volatile register or a memory and holds the information on the liquid crystal driving frequency FL transmitted from an external source and the information on the lighting frequency FB transmitted from an external source.

The control unit 521 detects a change in the liquid crystal driving frequency based on the information held in the frequency information holding unit 526. When the change in the liquid crystal driving frequency is detected, the control unit 521 read out the information on the lighting frequency FB of the LEDs 562 from the frequency information holding unit 526. Then, based on the information on the lighting frequency FB, the control unit 521 obtains the maximum turn-on time Tmax in the same manner as in the first embodiment. As above, in the present embodiment, the information on the lighting frequency FB, that is the information required for the time-sharing driving of LEDs 562, are supplied from an external source (for example, a host) to the LED drive circuit 520. Then, based on the information (the information on the lighting frequency FB of the LEDs 562), the LED drive circuit 520 turns on a plurality of LEDs 562 in the illuminating unit 560 in a time-sharing manner and on a block-by-block basis.

<2.2 Advantageous Effects>

According to the present embodiment, as in the first embodiment, it is possible to implement the backlight 50 that can perform the time-sharing driving of LEDs 562 so as not to cause flicker even when the liquid crystal driving frequency changes dynamically. In addition, according to the present embodiment, in regard to the combination of the liquid crystal driving frequency and the lighting frequency of the LEDs 562, not only predetermined combinations but also any combination can be adopted. Furthermore, according to the present embodiment, a change of the liquid crystal driving frequency and a change of the lighting frequency of the LEDs 562 can be performed at the same timing.

<3. Others>

Although the present invention is described in detail above, the above description is to be considered in all respects as illustrative and not restrictive. It will be understood that many other changes or modifications may be made without departing from the true spirit and scope of the present invention.

What is claimed is:

1. A backlight for a display panel, the backlight including a plurality of LEDs as light sources, and the backlight comprising:
   a plurality of LED units divided into a plurality of blocks, each of the plurality of LED units including one or more LEDs, and
   a turn-on control circuit configured to turn on the plurality of LEDs in a time-sharing manner and on a block-by-block basis, wherein
   in regard to a first frequency and a second frequency which are two frequencies satisfying a following expression, when a driving frequency of the display panel changes from the first frequency to the second frequency, the turn-on control circuit increases a lighting frequency of the plurality of LEDs:
   the first frequency>the second frequency, wherein
   the turn-on control circuit includes a table that holds a correspondence relationship between the driving frequency of the display panel and the lighting frequency of the plurality of LEDs, and
   the turn-on control circuit determines the lighting frequency of the plurality of LEDs by referring to the table when the driving frequency of the display panel changes, and
   correspondence relationship is held in the table such that when the driving frequency of the display panel becomes 1/n, the lighting frequency of the plurality of LEDs is multiplied by n.

2. The backlight according to claim 1, wherein
   the turn-on control circuit includes a driving frequency detection unit configured to determine the driving frequency of the display panel based on a synchronization signal that are supplied from outside, and
   the driving frequency detection unit includes a timer, measures a length of one frame period based on the synchronization signal by using the timer, and determines the driving frequency of the display panel based on the length of one frame period that is a measurement result.

3. The backlight according to claim 1, wherein information on the lighting frequency of the plurality of LEDs is supplied from outside, and the turn-on control circuit turns on the plurality of LEDs based on the information.

4. The backlight according to claim 1, wherein
   the turn-on control circuit includes
      a power supply switching circuit configured to switch a supply destination of a power source voltage for LED driving among the plurality of blocks, and
      an LED drive circuit configured to control a time length for supplying an LED that is a lighting target with a current, by using a PWM signal,
   the LED drive circuit transmits a switching control signal to the power supply switching circuit based on the lighting frequency of the plurality of LEDs and a number of the plurality of blocks, and
   the power supply switching circuit switches the supply destination of the power source voltage among the plurality of blocks based on the switching control signal.

5. A display device comprising:
   a display panel including a display portion configured to display an image, and
   a backlight configured to irradiate the display portion with light, the backlight including a plurality of LEDs as light sources, wherein
   the backlight includes
      a plurality of LED units divided into a plurality of blocks, each of the plurality of LED units including one or more LEDs, and
      a turn-on control circuit configured to turn on the plurality of LEDs in a time-sharing manner and on a block-by-block basis, and
   in regard to a first frequency and a second frequency which are two frequencies satisfying a following expression, when a driving frequency of the display panel changes from the first frequency to the second frequency, the turn-on control circuit increases a lighting frequency of the plurality of LEDs:
   the first frequency>the second frequency, wherein
   the turn-on control circuit includes a table that holds a correspondence relationship between the driving frequency of the display panel and the lighting frequency of the plurality of LEDs, and
   the turn-on control circuit determines the lighting frequency of the plurality of LEDs by referring to the table when the driving frequency of the display panel changes, and
   correspondence relationship is held in the table such that when the driving frequency of the display panel becomes 1/n, the lighting frequency of the plurality of LEDs is multiplied by n.

* * * * *